United States Patent [11] 3,603,735

[72] Inventor Donald Jack Cleobury
Hinckley, England
[21] Appl. No. 839,579
[22] Filed July 7, 1969
[45] Patented Sept. 7, 1971
[73] Assignee The General Electric Company Limited
[32] Priority July 5, 1968
[33] Great Britain
[31] 32242/68

[54] SYNCHRONIZING ARRANGEMENT FOR A PULSE-COMMUNICATION RECEIVER

9 Claims, 2 Drawing Figs.

[52] U.S. Cl. .......... 179/15 BS, 178/69.5 R
[51] Int. Cl. .......... H04j 3/06
[50] Field of Search .......... 179/15 BS; 178/69.5

[56] References Cited

UNITED STATES PATENTS 3,069,504 12/1962 Kaneko .......... 178/69.5
3,127,475 3/1964 Coulter .......... 179/15 (BS)
3,317,669 5/1967 Ohnsorge .......... 178/69.5
3,482,044 12/1969 Kaneko .......... 178/69.5

*Primary Examiner*—Kathleen H. Claffy
*Assistant Examiner*—David L. Stewart
*Attorney*—Kirschstein, Kirschstein, Ottinger & Frank

ABSTRACT: A pulse-code-modulation synchronizing arrangement for a system using a synchronizing pulse pattern having a first simple portion which occurs commonly at random in the transmitted signal and a second more extensive portion which is highly improbable at random. The receiver, in seeking synchronism, resets its phase at each genuine and false occurrence of the simple portion. Synchronism is confirmed if no further reset occurs during the extent of the second portion (which does not contain the simple portion). The above resetting is on a channel basis: digit synchronism is achieved by slipping a digit periodically with sufficient intervening time to obtain overall synchronism by channel resetting if the digit phase is in fact correct. Loss or absence of synchronism is rapidly determined by the closely repeated presence of the common first portion.

Figure 1:
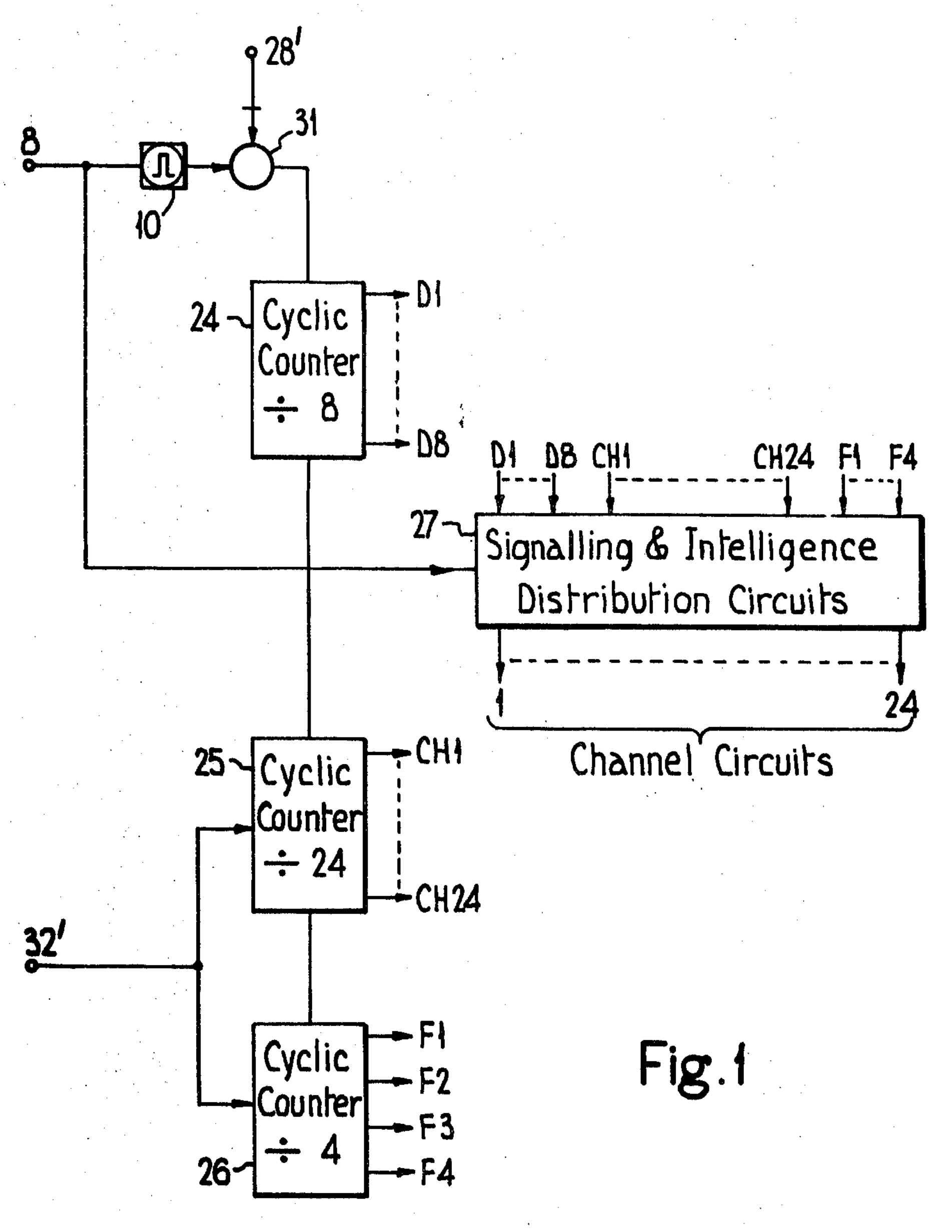

INVENTOR
DONALD J. CLEOBURY

BY Kirschstein, Kirschstein, Ottinger & Frank
ATTORNEYS

INVENTOR
DONALD J. CLEOBURY

BY Kirschstein, Kirschstein, Ottinger & Frank
ATTORNEYS

SYNCHRONIZING ARRANGEMENT FOR A PULSE-COMMUNICATION RECEIVER

This invention relates to synchronizing arrangements for use in pulse-code-modulation (P.C.M.) receivers. It is particularly applicable for use in multichannel time-division multiplex P.C.M. systems.

It has been proposed that mutliplexed P.C.M. signals should consist of frames each comprising 24 coded samples of information relating to 24 corresponding information channels. Eight pulse-elements, that is, pulses present or absent in allotted time slots, are used to carry the information associated with each channel although one of the eight may be reserved for supervisory and signalling information. It is well known to provide synchronizing in the transmitted signal in the form of a distinctive pulse pattern which can be recognized in the receiver and used to align the phases of the multiplex cycle of the received signal and the cycle of distribution of the various information samples to the channel circuits of the receiver.

The synchronizing pattern may be confined to a single channel used solely for this purpose, or may be distributed over a number of channels of a frame. In the latter case, one of the pulse-elements in each such channel is allotted for this purpose, this one replacing the supervisory pulse-element.

It has been found that it is sufficient for a distributed synchronizing pattern to occupy only one of several frames in a cycle thus providing more supervisory and signalling capacity.

According to the present invention, a synchronizing arrangement for a time-division-multiplex pulse-code-modulation receiver, comprises first circuit means responsive to a first portion of a synchronizing pulse pattern to reset the phase of operation of the receiver to a predetermined phase reference, said first portion being of common occurrence at random in the received signal so that in the absence of synchronism repeated phase resetting occurs, and second circuit means responsive to a second portion of the synchronizing pulse pattern when received in predetermined time relation with said first portion in a predetermined number of successive cycles of said synchronizing pulse pattern to inhibit said first circuit means, said second portion of the synchronizing pulse pattern being of relatively rare random occurrence.

Said predetermined time relation is preferably obtained when the synchronizing pulse pattern occupies the same digit position in a number of successive channels.

The first circuit means may effect a phase resetting equivalent to an integral number of channel time slots, and the arrangement may further comprise digit reset means for periodically changing the phase of operation of the receiver by a fraction of a channel time slot so as to scan the digit time slots for the synchronizing pulse pattern, said digit reset means being inhibited by said second circuit means in response to reception of a said second portion of the synchronizing pulse pattern in said predetermined time relation.

The second portion of the synchronizing pulse pattern is preferably of substantially greater extent than the first portion and preferably has no part identical with the first portion, the second circuit means producing an inhibiting signal at the attainment of a point in the multiplex cycle which point follows said phase reference after an interval corresponding to the extent of the second portion of the synchronizing pulse pattern, and the inhibiting signal constituting an indication of synchronism and being applied to inhibit said digit-reset means.

One or more pulse patterns which occur commonly at random in the received signal and which are not contained in the second portion of the synchronizing pulse pattern may have the same effect as the first portion of the synchronizing pulse pattern in producing the error state of the first storage means.

Figure 2:
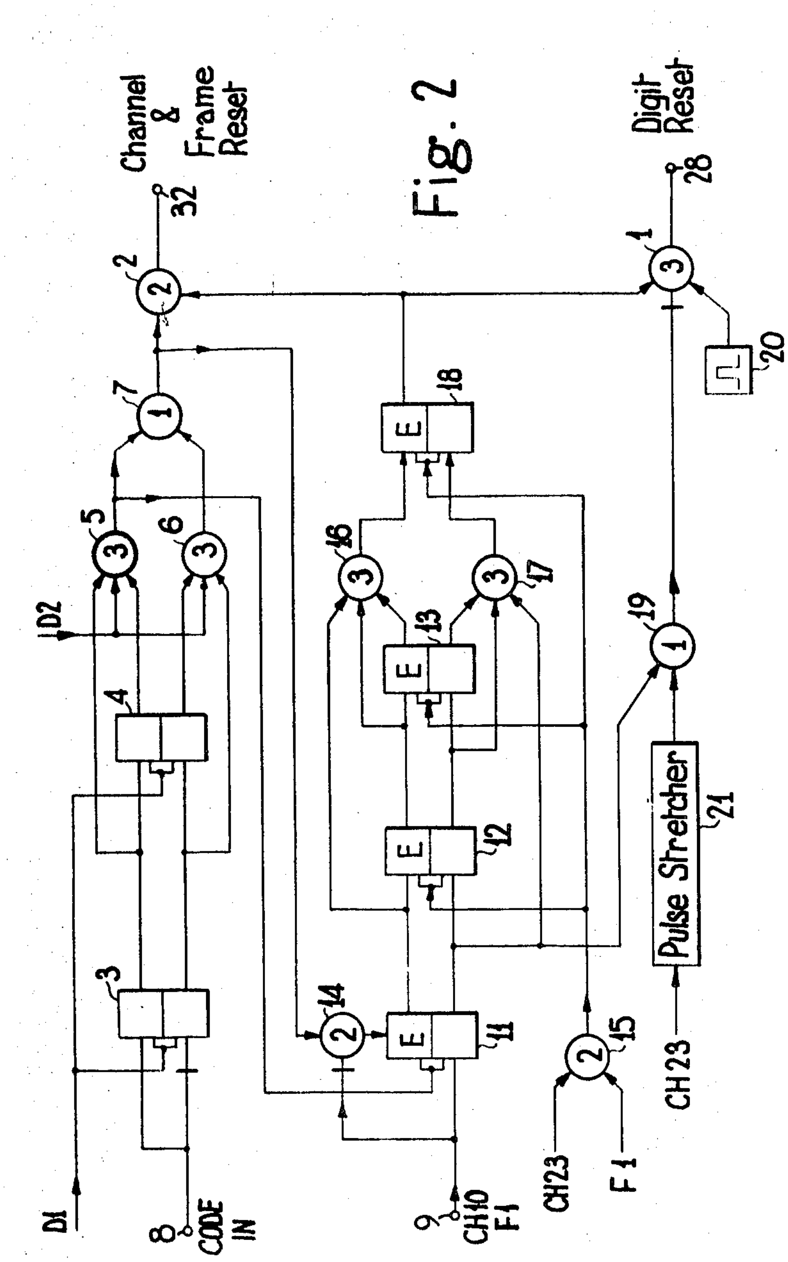

A P.C.M. communication receiver employing a synchronizing arrangement in accordance with the invention will now be described, by way of example, with reference to the accompanying circuit drawings, of which:

FIG. 1 shows schematically basic equipment for demultiplexing a received P.C.M. signal; and FIG. 2 shows circuitry for monitoring and establishing synchronism between the received signal and its distribution to the various channel circuits. The number inside a circle indicating a gate is indicative of the number of inputs at logic 1 level required to change the output signal from one state to the other.

The receiver is adapted to operate in a system using a transmitted signal in which one cycle of intelligence information is called a frame and in which one cycle of supervisory and transmission information comprises four frames. Thus each frame comprises the pulse-elements of 24 channels. The pulse-elements of each channel consist of a first, supervisory, signalling or synchronizing pulse-element and seven pulse-elements representing the binary-coded magnitude of the particular sample. These seven pulse-elements to this extent represent binary digits on the basis: a pulse present represents the binary digit '1' and a pulse absent represents the binary digit '0'.

In the first frame of the four-frame cycle the first pulse-elements of each of channel nine to 24 make up the synchronizing pattern, the remaining first pulse-elements either not being used or being available for supervisory purposes. The synchronizing pattern is represented on the above basis by the binary digits 1101010101010101. The first portion of this pattern, that is, the first two digits constitute a marker for the phase of the received signal, indicating channels nine and 10 of frame one.

Referring to FIG. 1, the receiver incorporates a clock-pulse generator 10 the frequency of which is locked to the 'bit rate' of the received signal which is applied to terminal 8. The clock pulses are counted down by a counter 24 to provide eight trains of digit pulses D1–D8, successively staggered by one digit to correspond to the eight digits of each channel group. One of the trains of digit pulses is counted down by a counter 25 to provide 24 staggered trains of channel pulses CH1–CH24, each train having a pulse repetition rate equal to the sampling frequency and a pulse width equal to the period of the digit pulse train. One of the 24 trains of channel pulses is counted down by a counter 26 to provide four trains of frame pulses F1–F4 each train marking a respective one of the four frames in each cycle and the duration of a frame pulse being equal to a frame period.

The phase of the distribution of information to the channel circuits of the receiver is determined by the phase of the various signals thus produced, which are interlocked by the manner of their production.

Distribution circuits for the receiver are shown schematically, referenced 27, and these effect demultiplexing of the received signal and distribution to 24 channel circuits in known manner, under the control of the 'local' pulse trains D1–D8, CH1–CH24, and F1–F4.

Two circuits are provided for adjusting the local phase to synchronize with the received signal phase. These are shown in FIG. 2. One of the two circuits includes a three-input AND-gate 1, which when enabled, supplies a pulse by way of terminal 28, to terminal 28' of FIG. 1 to inhibit, by means of a gate 31, a clock pulse in the train being counted down and so effectively slips the phase by one digit time slot.

The second phase adjustment circuit includes a two-input AND-gate 2 which, when enabled, supplies a pulse, by way of terminal 32 in FIG. 2 and 32' in FIG. 1, which overrides the digit train input signal to counter 25 and resets the digit pulse counter 25 to its channel 10 output and the channel pulse counter 26 to its frame one output. It will be noted that these are the channel and frame of the second digit of the marker pattern '11' of the received signal.

As this reset circuit does not apply to the clock pulse counter 24, the channel and frame reset, as imposed by the enabling of AND-gate 2, will shift the receiver operating phase from digit two in the previously defined channel, to digit two in the newly obtained channel 10.

In order to respond to the marker pattern '11' two bistable circuits 3 and 4 are provided. These are connected in cascade, the states of bistable circuit 3 providing respective steering signals for the states of bistable circuit 4. Both of the bistable circuits 3 and 4 are triggered by the digit-one (D1) pulse, that is, the first digit pulse in each count of eight. Bistable circuit 3 has one state steered by the received signal which is applied to a terminal 8 and the other state by the received signal after inversion. At every digit-one pulse as generated by the receiver, therefore, the bistable circuit 3 will adopt a state determined by the coincident pulse-element of the received signal and the bistable circuit 4 will adopt the state previously held by the bistable circuit 3. In the absence of synchronism between the receiver and the transmitter, these two adopted states will in general bear no relation to the phase of the received signal.

A three-input AND-gate 5 derives two input signals from corresponding stages of the bistable circuits 3 and 4, the third signal being the digit-two (D2) pulse signal. A three-input AND-gate 6 similarly derives two input signals one from each of the other two corresponding states of the bistable circuits 3 and 4 and the third again being the digit-two pulse signal. At each digit-two pulse, therefore, AND-gate 5 is enabled if the preceding two digit-one pulses coincided with pulses in the received signal, and, AND-gate 6 is enabled if those preceding two digit-one pulses coincides with the absence of pulses in the received signal. The outputs of AND-gate 5 and AND-gate 6 provide respective input signals to a two input OR-gate 7 which is therefore enabled during each digit-two pulse which follows pulse-elements representing '11' or '00' in the preceding digit-one positions.

The output of OR-gate 7 provides one of the two input signals for AND-gate 2, previously mentioned as effecting, when enabled, a channel and frame reset.

If the phase relation between the received signal and the receiver distribution cycle is such that synchronism can be obtained by a phase shift of a whole number of channels then it can be seen that the circuitry so far described will, after a period, attain synchronism when the genuine marker pattern '11' drops into the register constituted by bistable circuits 3 and 4. The local cycle will be reset to the received cycle by way of gates 5, 7 and 2 at the digit-two pulse following the 'registration' of this marker pattern.

Clearly, however, this is not sufficient because the phase shift necessary to attain synchronism will in general be a fractional number of channels, and in addition, even if the necessary phase shift were a whole number of channels, two successive '0's or '—1's in channels one to eight or in other frames would throw the system out of synchronism.

The following circuitry meets the additional requirements. Three bistable circuits 11, 12 and 13 are connected in cascade. The two states of the first bistable circuit, 11, provide respective steering signals for the second, 12, which in turn provides steering signals for the respective states of the third, 13. Bistable circuits 11 and 12 constitute a shift register. Each of the three bistable circuits will be described as being 'set' to an error state (referenced E) and 'offset' to a no-error or correct state. The steering connections are such that an error state is stepped through the three bistable circuits by successive triggering. The first bistable circuit 11 has one steering input to its 'offset' state, this being the frame one, channel 10 pulse signal applied by way of terminal 9 from FIG. 2, and a triggering input, in respect of this channel 10 signal only, derived from the output of AND-gate 5. Bistable circuit 11 is thus triggered to its offset state when a channel 10 steering pulse coincides with the second of two '1's (whether the true '11' marker pattern or not) in successive digit-one pulse positions.

A self-triggering input to the 'set' state is derived from the output of OR-gate 7 by way of an inhibit gate 14, the inhibit input being supplied with the channel 10 pulse signal. Bistable circuit 11 is thus triggered to its set state when two '1's or two '0's occur in successive digit-one positions and the second of the two ('1's or '0's) does not occur in channel 10.

Triggering inputs of the bistable circuits 12 and 13 are supplied with a signal which is derived from a two-input AND-gate 15 to which a channel 23 signal (CH 23) and a frame-one (F1) signal are supplied, these signals being derived from counters 25 and 26 in FIG. 2.

A three-input AND-gate 16 is supplied with three signals from the outputs, respectively, of the 'set' states of bistable circuits 11, 12 and 13. This AND-gate 16 is thus enabled when the three bistable circuits 11, 12 and 13 are set to their error state. Similarly, a three-input AND-gate 17 is supplied with three signals from the outputs, respectively, of the 'offset' states of the bistable circuits 11, 12 and 13. This AND-gate 17 is thus enabled when the three bistable circuits 11, 12 and 13 are in their correct, i.e., no-error, states.

The outputs of AND-gates 16 and 17 supply steering signals to, respectively, the 'set' and 'offset' states of a bistable circuit 18. This bistable circuit 18 is supplied with the same triggering signal as are the bistable circuits 12 and 13, that is, a channel 23 pulse in frame one.

The 'set' state of bistable circuit 18 provides the remaining one of the two input signals for the phase reset gate 2 previously mentioned. This gate 2 is therefore enabled when the bistable circuit 18 is in its set, i.e., its error state.

The AND-gate 1 which effects a single digit phase shift, derives one input signal from the 'set' state of the bistable circuit 18 and is thus disabled when the bistable circuit 18 is offset to its correct i.e., no-error state. The second input of the AND-gate 1 is an inhibit input to which is applied the output signal of an OR-gate 19. A first input signal to the OR-gate 19 is derived from the 'offset' state of the bistable circuit 11 and the second input signal to OR-gate 19 is a greatly stretched (21) channel 23 pulse. The stretched pulse has a duration of approximately three complete signals cycles, that is, 12 frames. Single digit phase shift is thus prevented, both, when there is a possible synchronism condition (i.e. bistable circuit 11 has just been offset), and, when a channel 23 pulse arises, which, as will be explained, implies some confirmation of the synchronism condition. The third input signal to the AND-gate 1 consists of a single digit-pulse occurring not more than once every four frames. This is provided by a blocking oscillator 20.

The operation of the circuit is as follows. The received signal is accepted by the receiver which, will initially produce digit, channel and frame pulses on an arbitrary phase basis and will consequently attempt to distribute the received signal to the channel circuits on the same arbitrary basis. The receiver will thus in general be out of synchronism with the transmitter. Patterns of '11' and'00' will clearly occur commonly in the received signal at the arbitrary local digit-one time so that AND-gate 5 and OR-gate 7 will provide output pulses at the digit-two time as a result of these, in general, error patterns.

It may happen that a '11' pulse from AND-gate 5 will coincide on some occasion with a channel 10 steering pulse to bistable circuit 11, in which case this bistable circuit 11 will be offset to its no-error state, the channel 10 pulse inhibiting the self-triggering pulse to the 'set' state of bistable circuit 11. This self-triggering pulse is the same '11' error pulse by way of OR-gate 7. In general however, in channels other than channel 10, either '11' or '00' error pulses repeatedly arising from the OR-gate 7 will set the bistable circuit 11 to its error state by way of the inhibit gate 14. It will be recalled that the following bistable circuits 12, 13 and 18 are each triggered by a channel 23 pulse in frame one of each cycle. If the bistable circuit 18 should happen, initially, to be in its no-error state, i.e., offset, then the AND-gate 2 will be disabled and a channel 23 pulse will arise as no resetting back to channel 10 will occur. The effect of such a channel 23 pulse will be to step the error state of bistable circuit 11 to bistable circuit 12. A further such channel 23 pulse will step the error state to bistable circuit 13 whereupon the next one will trigger bistable circuit 18 to its error state, the AND-gate 16 having now been enabled to provide a steering signal to the 'set' state of bistable circuit 18. The channel reset AND-gate 2 will then be enabled and repeated resetting will take place as mentioned above.

If any of the bistable circuits 11, 12, 13 and 18 are initially in their error states this process will be correspondingly 'short-circuited'. (For immediately bistable circuit 18 is set, the repeated resetting to channel 10 will prevent channel 23 being reached to produce triggering of bistables 12, 13 and 18.)

In general therefore the bistable circuit 18 will attain its error state either initially or after a short period from switching on the receiver. From that time, AND-gate 2 will be enabled and at every error pulse resulting from a '11' or '00' pattern the receiver cycle will be reset. The effect of this can be seen to be that the receiver repeatedly looks for synchronism starting from channel 10 frame one, running on for probably fewer than a dozen digit-one pulses and resetting to channel 10 again at the occurrence of a further '00' or '11' pattern. As mentioned previously however the resetting achieved by AND-gate 2 can never achieve synchronism if the locally generated digit-one pulses are not scanning the genuine digit-one pulse-elements in the received signal.

Because the above searching and resetting generally extends only a short time after the channel 10, channel 23 will not be reached. Thus the stretched, inhibiting, channel 23 pulse applied to AND-gate 1 will not appear and approximately once in every four frames of the received signal, the AND-gate 1 will be enabled, a single clock pulse input to the clock-pulse counter will be suppressed and the receiver phase will be slipped accordingly by one digit intervals.

After each such digit reset the channel reset will be affected many times until, when digit synchronism has been achieved, one of the channel resets, i.e., that one caused by the marker pattern '11' of channels 9 and 10 setting the bistable circuits 3 and 4 imposes channel 10 on the receiver distribution and sets bistable circuit 11. This now being a true synchronizm condition the second portion of the synchronizing signal, that is, the repeated 01' pattern following the marker pattern, will prevent any further resetting so that a channel 23 pulse will at last arise, be stretched by pulse stretch 21, and inhibit the digit reset, by way of gates 19 and 1, at the same time offsetting bistable circuit 12 to the no-error state. Thus, the counter 25, producing the channel 23 pulse may be considered as part of the circuitry responsive to the second portion, the repeated 01, of the synchronizing pulse pattern to provide an indication of synchronism In order that a digit reset pulse should not upset the situation if it should by mischance occur between the offsetting of bistable circuit 11 and the following channel 23 pulse, the output signal from the offset state of bistable circuit 11 inhibits the digit reset AND-gate 1 by way of the OR-gate 19.

Having obtained an indication of synchronism, i.e., a channel 23 pulse, and had this 'indication' recorded in bistable circuit 12, it does not then matter that signalling or supervisory information in the digit-one pulse-elements of the three nonsynchronizing frames should cause resetting of the channel and frame distribution. This is because the local and received digit-ones are now synchronized, the digit reset is inhibited (by the stretched CH23 pulse) and chance resetting by signalling or other digit-ones can only disturb the phase by an integral number of channels. The receiver is therefore brought into immediate synchronism by the single marker pattern which must appear in the bistable circuit three-fourths register at the beginning of the next synchronizing pattern. Bistable circuit 11 may therefore change state many times between a first genuine offsetting and the next genuine one without losing the information, which is stored in bistable circuit 12.

The second channel 23 pulse to arise will transfer the no-error indication to bistable circuit 13 and at the following marker pattern, bistable circuit 11 will again be offset (if not previously so) and the AND-gate 17, providing an indication of three successive marker patterns, is enabled. At the third channel 23 pulse, therefore, the final bistable circuit 18 is offset to its no-error state. The presence of synchronism is thus confirmed and both the digit and channel reset AND-gates 1 and 2 are disabled.

The receiver then continues to operate in synchronism, when each marker pattern '11' will confirm the bistable circuit 11 in its no-error state or offset it to that state if an intervening 11' or '00' pattern due to signalling or other information should set it to its error state.

In the case of a genuine phase slip from synchronism the '11' marker pattern will fail to coincide with the channel 10 pulse and bistable circuit 11 will be set to its error state by way of its self-triggering input which is not then inhibited. A continuation of such a phase slip will cause the error state of bistable circuit 11 to be stepped along to bistable circuits 12 and 13 whereupon bistable circuit 18 will be set to its error state so accepting and confirming the fact that phase slip has occurred. The digit and channel reset gates 1 and 2 are thereby enabled to reset the phase as described above.

I claim:

1. A synchronizing arrangement for a time-division-multiplex pulse-code-modulation receiver, comprising first circuit means responsive to a first portion of a synchronizing pulse pattern to reset the phase of operation of the receiver to a predetermined phase reference, said first portion being of common occurrence at random in the received signal so that in the absence of synchronism repeated phase resetting occurs, and second circuit means responsive to a second portion of the synchronizing pulse pattern when received in predetermined time relation with said first portion in a predetermined number of successive cycles of said synchronizing pulse pattern to inhibit said first circuit means, said second portion of the synchronizing pulse pattern being of relatively rare random occurrence.

2. A synchronizing arrangement according to claim 1 wherein said first and second circuit means are responsive to signals received in predetermined digit time-slots occurring at the channel spacing.

3. A synchronizing arrangement according to claim 2, wherein said first circuit means effects a phase resetting equivalent to an integral number of channel time slots, the arrangement further comprising digit reset means for periodically changing the phase of operation of the receiver by a fraction of a channel time slot so as to scan the digit time slots for the synchronizing pulse pattern, said digit reset means being inhibited by said second circuit means in response to reception of a said second portion of the synchronizing pulse pattern in said predetermined time relation.

4. A synchronizing arrangement according to claim 3, wherein said second portion of the synchronizing pulse pattern is of substantially greater extent than said first portion and has no part identical with said first portion, and wherein said second circuit means produces an inhibiting signal at the attainment of a point in the multiplex cycle which point follows said phase reference after an interval corresponding to the extent of said second portion of the synchronizing pulse pattern, said inhibiting signal constituting an indication of synchronism and being applied to inhibit said digit-reset means.

5. A synchronizing arrangement according to claim 4, including first bistable storage means which adopts a synchronism state in response to the coincident occurrence of a said first portion of the synchronizing pulse pattern and said phase reference, said first bistable storage means adopting an error state in response to the occurrence of a said first portion of the synchronizing pulse pattern in the absence of said phase reference.

6. A synchronizing arrangement according to claim 5, wherein said first bistable storage means is responsive to a further pulse pattern which occurs commonly at random in the received signal and which is not contained in said second portion of the synchronizing pulse pattern, said first bistable storage means being responsive to said further pulse pattern to adopt said error state.

7. A synchronizing arrangement according to claim 5, and comprising a shift register for which the states of said first bistable storage means supply steering signals, said indications of synchronism constituting stepping signals for the shift register, and further bistable storage means responsive to said first storage means and to said shift register, the further storage means adopting an error state in response to the presence of coincident error states of the first storage means and of the stages of the shift register, and the further storage means adopting a synchronism state in response to the presence of coincident synchronism states of the first storage means and of the stages of the shift register.

8. A synchronizing arrangement according to claim 5, wherein said digit reset means is inhibited in response to the synchronism state of said first storage means.

9. A synchronism arrangement according to claim 1, wherein said first portion of the synchronizing pulse pattern comprises the digits 11' and said second portion comprises a number of the digit pairs '01' in sequence.